United States Patent
Jiang

(10) Patent No.: US 11,606,050 B2
(45) Date of Patent: Mar. 14, 2023

(54) METHOD AND SYSTEM FOR CONTROLLING ELECTRIC MOTOR, AND CONTROLLER

(71) Applicant: HANGZHOU LEADERWAY ELECTRONICS CO., LTD, Zhejiang (CN)

(72) Inventor: Dekai Jiang, Zhejiang (CN)

(73) Assignee: Hangzhou Leaderway Electronics Co., Ltd, Zhejiang (CN)

( * ) Notice: Subject to any disclaimer, the term of this patent is extended or adjusted under 35 U.S.C. 154(b) by 10 days.

(21) Appl. No.: 17/250,819

(22) PCT Filed: Nov. 21, 2019

(86) PCT No.: PCT/CN2019/119890
§ 371 (c)(1),
(2) Date: Mar. 5, 2021

(87) PCT Pub. No.: WO2020/103894
PCT Pub. Date: May 28, 2020

(65) Prior Publication Data
US 2021/0320598 A1    Oct. 14, 2021

(30) Foreign Application Priority Data

Nov. 22, 2018 (CN) .......................... 201811397469.8

(51) Int. Cl.
*H05K 7/14* (2006.01)
*H02P 6/21* (2016.01)
(Continued)

(52) U.S. Cl.
CPC .................. *H02P 6/21* (2016.02); *H02P 6/08* (2013.01); *H02P 8/14* (2013.01)

(58) Field of Classification Search
CPC ...... H02P 6/21; H02P 6/08; H02P 8/14; H02P 8/32; H02P 21/05; H02P 23/04
See application file for complete search history.

(56) References Cited

U.S. PATENT DOCUMENTS 5,202,613 A * 4/1993 Kruse ....................... H02P 6/08
                                                       318/400.34
5,466,999 A * 11/1995 Hutsell ...................... H02P 6/21
                                                       318/431

(Continued)

FOREIGN PATENT DOCUMENTS

| CN | 101984554 A | 3/2011 |
| CN | 104253572 A | 12/2014 |

(Continued)

OTHER PUBLICATIONS

Office Action in Chinese Application No. 201811397469.8 dated Apr. 30, 2021 in 15 pages.

(Continued)

*Primary Examiner* — Muhammad S Islam
(74) *Attorney, Agent, or Firm* — Knobbe, Martens, Olson & Bear, LLP

(57) ABSTRACT

Provided are a method and system for controlling an electric motor, and a controller. The method comprises: controlling an electric motor to operate in an open-loop manner; determining whether a rotational speed of the electric motor reaches a preset rotational speed; if so, determining whether the absolute value of an angle difference between an open-loop angle and a calculated position angle of the electric motor is greater than a preset angle; and if the absolute value of the angle difference is less than or equal to the preset angle, controlling the electric motor to operate in a closed-loop manner so as to avoid the situation where the electric motor cannot operate stably due to problems such as electric (Continued)

motor speed vibration caused by too large an angle difference between the open-loop angle and the position angle.

18 Claims, 3 Drawing Sheets

(51) Int. Cl.
*H02P 6/08* (2016.01)
*H02P 8/14* (2006.01)

(56) References Cited

U.S. PATENT DOCUMENTS

| | | | | |
|---|---|---|---|---|
| 5,783,917 | A * | 7/1998 | Takekawa | H02P 6/21 |
| | | | | 318/431 |
| 9,263,979 | B2 | 2/2016 | Zhang et al. | |
| 2006/0132071 | A1* | 6/2006 | Oh | H02P 6/21 |
| | | | | 318/400.12 |
| 2011/0031914 | A1 | 2/2011 | Green et al. | |
| 2012/0308403 | A1* | 12/2012 | Minato | H02P 6/18 |
| | | | | 417/32 |
| 2014/0152212 | A1 | 6/2014 | Zhang et al. | |
| 2014/0197774 | A1* | 7/2014 | Liu | H02M 1/126 |
| | | | | 363/40 |
| 2015/0002059 | A1* | 1/2015 | Liu | H02P 27/047 |
| | | | | 318/400.04 |
| 2015/0002067 | A1* | 1/2015 | Nondahl | H02P 21/00 |
| | | | | 318/503 |
| 2016/0056740 | A1* | 2/2016 | Nondahl | H02P 6/182 |
| | | | | 318/400.11 |
| 2016/0218657 | A1* | 7/2016 | Nondahl | H02P 27/08 |
| 2018/0175752 | A1* | 6/2018 | Takeoka | F25B 49/02 |

FOREIGN PATENT DOCUMENTS

| | | | |
|---|---|---|---|
| CN | 105207558 A | 12/2015 | |
| CN | 106788066 A * | 5/2017 | ............ H02P 25/024 |
| CN | 106788066 A | 5/2017 | |
| CN | 107196567 A * | 9/2017 | ............. H02P 21/18 |
| CN | 107623467 A * | 1/2018 | |
| CN | 107623467 A | 1/2018 | |

OTHER PUBLICATIONS

Wang, et al. "Research on self-startup states process of back-EMF based sensorless vector control of PMSM", College of Electrical Engineering, Zhejiang University, vol. 15, No. 10, Oct. 2011, 7 pages.
Wang, et al. "Improved Fast Start-up Method of Sensor less of Permanent Magnet Synchronous Motor", National Engineering research Center of Energy Conversion and Control, vol. 49, No. 7, Jul. 2015, 3 pages.
International Search Report of PCT Application No. PCT/CN2019/119890—6 pages (Mar. 2, 2020).
Yin et al., "A Fast and Smooth Startup Method of Position Sensorless PMSM", Small & Special Electrical Machines, vol. 46, No. 7—4 pages (Jul. 28, 2018).
Extended European Search Report in EP Application No. 19886859.8 dated Jul. 25, 2022 in 8 pages.

* cited by examiner

METHOD AND SYSTEM FOR CONTROLLING ELECTRIC MOTOR, AND CONTROLLER

The present application is a US National Stage application of PCT international application PCT/CN2019/119890, filed on Nov. 21, 2019 which claims a priority to Chinese patent Application No. 201811397469.8, titled "METHOD AND SYSTEM FOR CONTROLLING MOTOR, AND CONTROLLER", filed on Nov. 22, 2018, each of which is incorporated herein by reference in its entirety.

TECHNICAL FIELD

The present disclosure relates to the field of motor control technologies, and more specifically, to a method and system for controlling a motor, and a controller.

BACKGROUND

With constantly improved requirements of energy saving, people's demand for control of variable frequency and speed regulation of a motor is higher and higher. In the related art, when the control of the variable frequency and speed regulation is performed on the motor, a field-oriented control (FOC) control algorithm is generally adopted. However, it is still necessary to improve the operation stability or start-up reliability of the motor.

SUMMARY

In view of this, a method and system for controlling a motor, and a controller are provided according to the present disclosure, so as to improve the operation stability or the start-up reliability of the motor.

To implement the above objectives, the present disclosure provides the following technical solutions.

A method for controlling a motor includes:

controlling a motor to operate in an open-loop manner;

determining whether a rotational speed of the motor reaches a preset rotational speed;

determining whether an absolute value of an angle difference between an open-loop angle and a calculated position angle of the motor is greater than a preset angle, in a case that the rotational speed of the motor reaches the preset rotational speed; and controlling the motor to operate in a closed-loop manner, in a case that the absolute value of the angle difference is less than or equal to the preset angle.

Optionally, the method further includes:

in a case that the absolute value of the angle difference is greater than the preset angle, determining whether an open-loop current of the motor is less than or equal to a minimum current value;

controlling the motor to operate in the closed-loop manner, in a case that the open-loop current of the motor is less than or equal to the minimum current value; and reducing the open-loop current of the motor, and returning to a step of determining whether the absolute value of the angle difference between the open-loop angle and the calculated position angle of the motor is greater than the preset angle, in a case that open-loop current of the motor is greater than the minimum current value.

Optionally, before determining whether the absolute value of the angle difference between the open-loop angle and the calculated position angle of the motor is greater than the preset angle, the method further includes:

integrating the rotational speed of the motor to obtain the open-loop angle of the motor; and calculating the calculated position angle of the motor by a position calculation unit.

Optionally, the preset angle ranges from 0° to 25°.

Optionally, $I_{limit}=I_{open}*n$, wherein n is greater than or equal to 0 and less than or equal to 1, $I_{limit}$ is the minimum current value, and $I_{open}$ is an initial open-loop current value.

A system for controlling a motor includes a first determination module, a second determination module, and a control module, where the first determination module is configured to determine whether a rotational speed of the motor reaches a preset rotational speed when the motor operates in an open-loop manner, and to send a first control instruction to the second determination module in a case that the rotational speed of the motor reaches the preset rotational speed;

the second determination module is configured to determine whether an absolute value of an angle difference between an open-loop angle and a calculated position angle of the motor is greater than a preset angle in response to a reception of the first control instruction, and to send a second control instruction to the control module in a case that the absolute value of the angle difference is less than or equal to the preset angle; and the control module is configured to control the motor to operate in the open-loop manner, and to control the motor to operate in a closed-loop manner in response to a reception of the second control instruction.

Optionally, the system further includes a third determination module; where the second determination module is further configured to send a third control instruction to the third determination module in a case that the absolute value of the angle difference is greater than the preset angle; and the third determination module is configured to determine whether an open-loop current of the motor is less than or equal to a minimum current value in response to a reception of the third control instruction; to send the second control instruction to the control module, in a case that the open-loop current of the motor is less than or equal to the minimum current value; and to reduce the open-loop current of the motor, and to send the first control instruction to the second determination module, in a case that the open-loop current of the motor is greater than the minimum current value.

Optionally, the system further includes a calculation module and a position calculation unit; where the calculation module is configured to integrate the rotational speed of the motor to obtain the open-loop angle of the motor; and the position calculation unit is configured to calculate a position angle of a rotor of the motor to obtain the calculated position angle.

Optionally, the preset angle ranges from 0° to 25°.

Optionally, $I_{limit}=I_{open}*n$, where n is greater than or equal to 0 and less than or equal to 1, $I_{limit}$ is the minimum current value, and $I_{open}$ is an initial open-loop current value.

A controller includes any system for controlling the motor described above.

The technical solutions provided by the present disclosure have the following advantages.

In the method and system for controlling the motor and the controller according to the present disclosure, after the rotational speed of the motor reaches the preset rotational speed in an open-loop operation of the motor, it is determined whether the absolute value of the angle difference between the open-loop angle and the calculated position angle of the motor is greater than the preset angle. If the absolute value of the angle difference is less than or equal to the preset angle, the motor is controlled to operate in the closed-loop manner so as to avoid a situation where the motor cannot operate stably due to problems such as motor speed vibration caused by too large angle difference between the open-loop angle and the calculated position angle.

BRIEF DESCRIPTION OF DRAWINGS

In order to clearly illustrate technical solutions of embodiments of the present disclosure or in the related art, a brief description of accompanying drawings used in description of embodiments or the related art is given below. Obviously, the drawings in the following descriptions are only embodiments of the present disclosure, and for those skilled in the art, other drawings can be obtained according to the drawings provided without creative labor.

DESCRIPTION OF EMBODIMENTS

Figure 1:
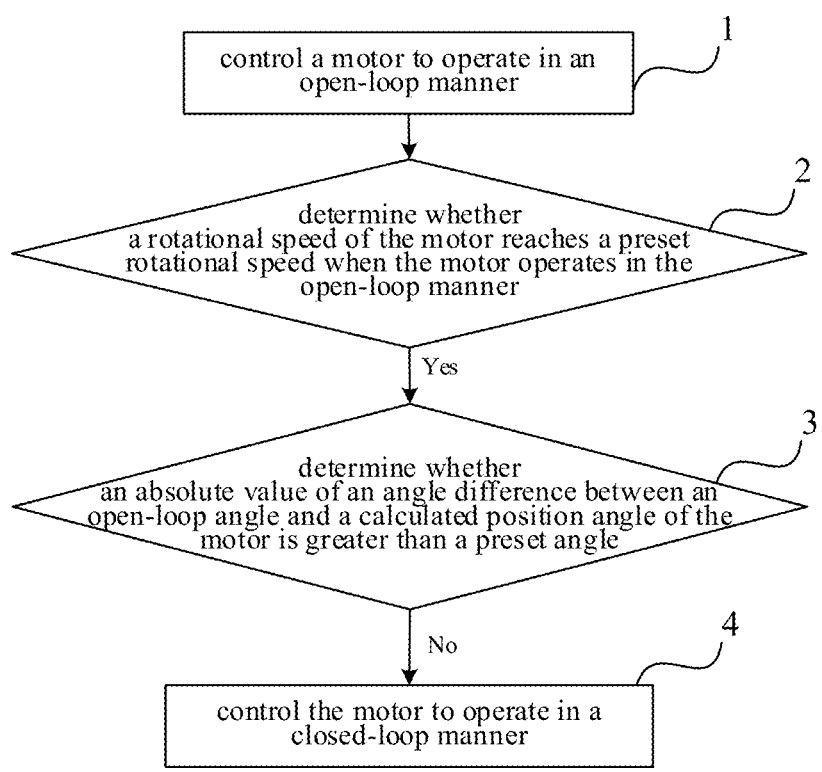
FIG. 1 is a flowchart of a method for controlling a motor to switch from an open loop to a closed loop according to an embodiment of the present disclosure.

As mentioned in Background, it is necessary to improve operation stability or start-up reliability of a motor. The inventor has discovered through research that when the motor is controlled to switch from an open-loop state to a closed-loop state, the motor often cannot run smoothly. The main reason for such a problem is that an open-loop current of the motor at the moment of switching is larger than a current actually required by a closed loop operation, resulting in a large angle difference between an open-loop angle and a position angle of a rotor of the motor, and further resulting in problems such as speed oscillations of the motor and a nonsinusoidal three-phase current. Consequently, the motor may be out of step or stop, or fail to start.

In view of this, a method for controlling a motor is provided according to the present disclosure, so as to overcome the above problems existing in the related art. The method includes:

controlling a motor to operate in an open-loop manner;
determining whether a rotational speed of the motor reaches a preset rotational speed;
determining whether an absolute value of an angle difference between an open-loop angle and a calculated position angle of the motor is greater than a preset angle, in a case that the rotational speed of the motor reaches the preset rotational speed; and
controlling the motor to operate in a closed-loop manner, in a case that the absolute value of the angle difference is less than or equal to the preset angle.

A system for controlling a motor is further provided according to the present disclosure. The system includes a first determination module, a second determination module, and a control module.

The first determination module is configured to determine whether a rotational speed of the motor reaches a preset rotational speed when the motor operates in an open-loop manner, and to send a first control instruction to the second determination module in response to the rotational speed of the motor reaching the preset rotational speed.

The second determination module is configured to determine whether an absolute value of an angle difference between an open-loop angle and a calculated position angle of the motor is greater than a preset angle in response to a reception of the first control instruction, and to send a second control instruction to the control module in a case that the absolute value of the angle difference is less than or equal to the preset angle.

The control module is configured to control the motor to operate in the open-loop manner, and to control the motor to operate in a closed-loop manner in response to a reception of the second control instruction.

In the method and system for controlling the motor and the controller according to the present disclosure, after the rotational speed of the motor reaches the preset rotational speed in an open-loop operation of the motor, it is determined whether the absolute value of the angle difference between the open-loop angle and the calculated position angle of the motor is greater than the preset angle. If the absolute value of the angle difference is less than or equal to the preset angle, the motor is controlled to operate in the closed-loop manner so as to avoid a situation where the motor cannot operate stably due to problems such as motor speed vibration caused by too large angle difference between the open-loop angle and the calculated position angle.

The above is the core concept of the present disclosure. In order to make the above objectives, features and advantages of the present disclosure more obvious and understandable, description of the technical solutions according to the embodiments of the present will be clarified and completed with accompanying drawings in the embodiments of the present disclosure. Obviously, the embodiments described here are only part of embodiments of the present disclosure and are not all embodiments of the present disclosure. Based on the embodiments of the present disclosure, other embodiments obtained by those skilled in the art without creative labor are within scope of the present disclosure.

A method for controlling a motor is provided according to an embodiment of the present disclosure. As illustrated in FIG. 1, the method includes following steps.

In step 1, a motor is controlled to operate in an open-loop manner.

In step 2, it is determined whether a rotational speed of the motor reaches a preset rotational speed. If the rotational speed of the motor reaches the preset rotational speed, the method goes to step 3.

In step 3, it is determined whether an absolute value of an angle difference between an open-loop angle and a calculated position angle of the motor is greater than a preset angle. If the absolute value of the angle difference is less than or equal to the preset angle, the method goes to step 4.

In step 4, the motor is controlled to operate in a closed-loop manner.

In the embodiment of the present disclosure, after the rotational speed of the motor reaches the preset rotational speed in the open-loop operation of the motor, if the absolute value of the angle difference between the open-loop angle and the calculated position angle of the motor is less than or equal to the preset angle, the motor is controlled to operate in the closed-loop manner so as to avoid a situation where the motor cannot operate stably due to problems such as motor speed vibration caused by too large angle difference between the open-loop angle and the calculated position angle.

Optionally, the preset angle ranges from 0° to 25°. Thus, the angle difference between the open-loop angle and the position angle is limited within a range of 0° to 25°, so as to avoid too large angle difference between the open-loop angle and the position angle.

Figure 2:
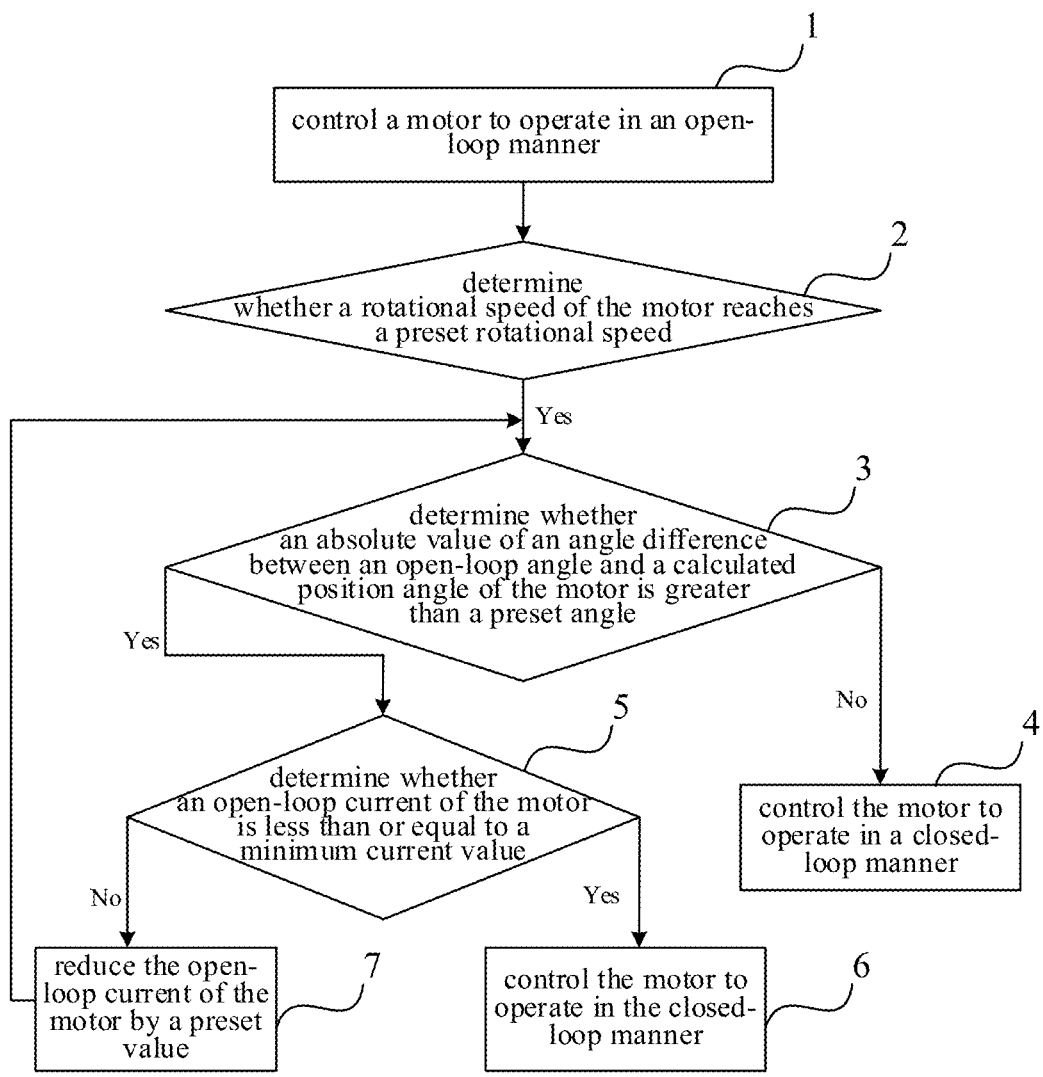
FIG. 2 is a flowchart of a method for controlling a motor to switch from an open loop to a closed loop according to another embodiment of the present disclosure.

Further, as illustrated in FIG. 2, in the method according to an embodiment of the present disclosure, if the absolute value of the angle difference between the open-loop angle and the calculated position angle is greater than the preset angle, the method further includes the following.

In step 5, it is determined whether an open-loop current of the motor is less than or equal to a minimum current value. If the open-loop current of the motor is less than or equal to a minimum current value, the method goes to step 6; otherwise, the method goes to step 7 and returns to step 3.

In step 6, the motor is controlled to operate in the closed-loop manner.

In step 7, the open-loop current of the motor is controlled to reduce.

In the embodiments of the present disclosure, when the motor is controlled to operate in the open-loop manner, the open-loop current of the motor is set to an initial open-loop current value. After the rotational speed of the motor reaches the preset rotational speed, if the absolute value of the angle difference between the open-loop angle and the calculated position angle of the motor is greater than the preset angle, it indicates that there may be problems that cause the motor to not run stably, such as motor speed vibration.

Since the above-mentioned calculated position angle is obtained through estimation, in order to avoid a situation where the absolute value of the angle difference is greater than the preset angle due to inaccurate estimation, whether the open-loop current of the motor is less than or equal to the minimum current value is further determined according to the embodiment of the present disclosure. If the open-loop current is less than or equal to the minimum current value, it indicates that a difference between the open-loop current and the current actually required by the closed loop will not be too large, and the angle difference between the open-loop angle and an actual position angle will not be too large. Therefore, the motor may be controlled to operate in the closed-loop manner.

If the open-loop current is greater than the minimum current value, it indicates that the difference between the open-loop current and the current actually required by the closed loop is too large, and the angle difference between the open-loop angle and the actual position angle is also too large. At this time, the open-loop current needs to be reduced, that is, the initial open-loop current value minus a preset value obtains a reduced open-loop current value. As the open-loop current decreases, the angle difference between the open-loop angle and the actual position angle also decreases. Therefore, after the method returns to step 3, if the absolute value of the angle difference is less than or equal to the preset angle, the motor may be controlled to operate in the closed-loop manner. If the absolute value of the angle difference is greater than the preset angle, the open-loop current is reduced again by the preset value, until the angle difference meets a condition for controlling the motor to operate in the closed-loop manner.

Optionally, $I_{limit}=I_{open}*n$, where n is greater than or equal to 0 and less than or equal to 1. When n=0, it indicates that the motor rotates forward under external power, and a forward rotational speed is greater than or equal to the preset rotational speed. In this case, the minimum current value $I_{limit}$ of the motor may be determined as 0, that is, n=0. When an external load is large, a current required to drive the motor may be consistent with the initial open-loop current value $I_{open}$. At this time, the minimum current value $I_{limit}$ of the motor may be determined as the initial open-loop current value, that is, $I_{limit}=I_{open}$, n=1, where $I_{limit}$ is the minimum current value, $I_{open}$ is the initial open-loop current value, and n is a constant value or a changing value.

Optionally, in an embodiment, controlling a reduction of the open-loop current of the motor specifically includes: setting updated $I_{open}=I_{open}-I_0$, where $I_0$ is the preset value, $I_0=I_{open}/f$, and f is an execution frequency of the aforementioned method. It should be noted that, in other embodiments, other manners may be used to control the reduction of the open-loop current of the motor, for example, $I_0$ may also be changed according to a function such as a trigonometric function.

It should be noted that, in the method according to an embodiment of the present disclosure, before determining whether the absolute value of the angle difference between the open-loop angle and the calculated position angle of the motor is greater than the preset angle, the method further includes:

integrating the rotational speed of the motor to obtain the open-loop angle of the motor; and calculating the position angle of the rotor of the motor by a position calculation unit.

That is to say, the calculated position angle is a position angle of a rotor of the motor estimated by the position calculation unit based on operating parameters of the motor. The operating parameters include current, voltage and so on. Optionally, the calculated position angle may be, for example, angle information obtained by using a Hall sensor, etc.

The following describes a specific control flow of the motor.

First, the motor is powered on, and the motor is controlled to start up in the open-loop manner. A speed $V_{run}$ of the motor is accelerated from a certain speed (such as 0, −5 rad/s) to the preset speed $S_{open}$ with an acceleration acc. The speed $V_{run}$ is integrated to obtain the open-loop angle $\theta_{open}$. In addition, the open-loop current $I_{open}$ of the motor is set as the initial open-loop current value. A speed $V_{est}$ and a position angle $\theta_{est}$ of the rotor of the motor is estimated.

When the speed of the motor reaches the preset speed $V_{open}$, the absolute value of the angle difference between the open-loop angle $\theta_{open}$ and the calculated position angle $\theta_{est}$ is calculated with $\Delta\theta=|\theta_{open}-\theta_{est}|$. It is determined whether $\Delta\theta$ is greater than the preset angle $\theta_{limit}$. If $\Delta\theta$ is not greater than the preset angle $\theta_{limit}$, the motor is controlled to operate in the closed-loop manner. If $\Delta\theta$ is greater than the preset angle $\theta_{limit}$, it is determined whether the open-loop current $I_{open}$ is less than or equal to the minimum current value $I_{limit}$. If the open-loop current $I_{open}$ is less than or equal to the minimum current value $I_{limit}$, the motor is controlled to operate in the closed-loop manner; and if the open-loop current $I_{open}$ is greater than the minimum current value $I_{limit}$, the open-loop current $I_{open}$ of the motor is reduced by the preset value, that is, $I_{open}=I_{open}-I_0$, and the flow returns to step 2 to repeat the following steps.

After the motor is controlled to operate in the closed-loop manner, a phase current for integral of a speed loop is initialized to $I_{open}$, $V_{est}$ is used as a feedback speed, and the calculated position angle $\theta_{est}$ is used as an angle θ of Park transformation and inverse Park transformation, so as to complete a switching action.

It should be noted that in an embodiment of the present disclosure, the motor is an electric motor. In another embodiment, the motor may be a stepping motor or the like.

In the method for controlling the motor according to the present disclosure, after the rotational speed of the motor reaches the preset rotational speed in the open-loop operation of the motor, it is determined whether the absolute value of the angle difference between the open-loop angle and the calculated position angle of the motor is greater than the preset angle. If the absolute value of the angle difference is less than or equal to the preset angle, the motor is controlled to operate in the closed-loop manner so as to avoid the situation where the motor cannot operate stably due to problems such as motor speed vibration caused by too large angle difference between the open-loop angle and the calculated position angle.

In addition, when the absolute value of the angle difference is greater than the preset angle, it is further determined whether the open-loop current of the motor is less than or equal to the minimum current value. If the open-loop current of the motor is less than or equal to the minimum current value, the motor is controlled to run in the closed-loop manner; and if the open-loop current of the motor is greater than the minimum current value, the open-loop current of the motor is controlled to reduce, and the method returns to step 3 to avoid a situation where the absolute value of the angle difference is greater than the preset angle due to an inaccurate position angle estimation.

Figure 3:
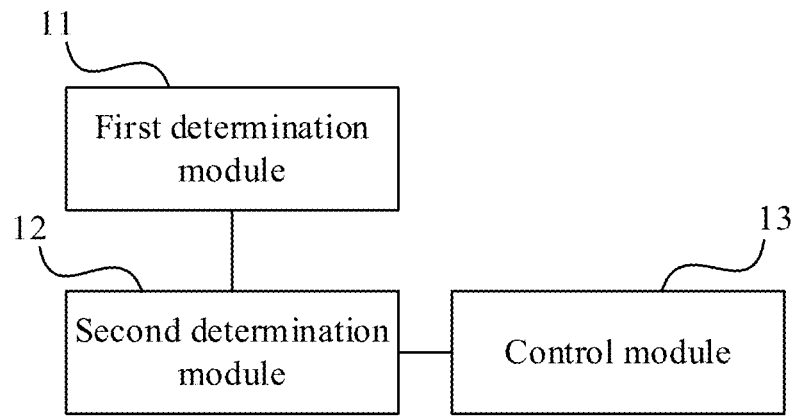
FIG. 3 is a schematic diagram of a system for controlling a motor to switch from an open loop to a closed loop according to an embodiment of the present disclosure.

A system for controlling a motor is further provided according to an embodiment of the present disclosure. As illustrated in FIG. 3, the system for controlling the motor includes a first determination module 11, a second determination module 12, and a control module 13.

The first determination module 11 is configured to determine whether a rotational speed of the motor reaches a preset rotational speed when a motor operates in an open-loop manner, and to send a first control instruction to the second determination module 12 when the rotational speed of the motor reaches the preset rotational speed.

The second determination module 12 is configured to determine whether an absolute value of an angle difference between an open-loop angle and a calculated position angle of the motor is greater than a preset angle in response to a reception of the first control instruction, and to send a second control instruction to the control module 13 when the absolute value of the angle difference is less than or equal to the preset angle.

The control module 13 is configured to control the motor to operate in the open-loop manner, and to control the motor to operate in a closed-loop manner in response to a reception of the second control instruction.

In an embodiment of the present disclosure, the control module 13 controls the motor to operate in the open-loop manner, the first determination module 11 determines whether the rotational speed of the motor reaches the preset rotational speed, and sends the first control instruction to the second determination module 12 when the rotational speed of the motor reaches the preset rotational speed.

The second determination module 12 is configured to determine whether the absolute value of the angle difference between the open-loop angle and the calculated position angle of the motor is greater than the preset angle in response to a reception of the first control instruction, to send the second control instruction to the control module 13 when the absolute value of the angle difference is less than or equal to the preset angle.

The control module 13 is configured to control the motor to operate in the closed-loop manner in response to a reception of the second control instruction, so as to avoid problems such as the motor cannot operate stably due to problems including motor speed vibration caused by too large angle difference between the open-loop angle and the calculated position angle.

Figure 4:
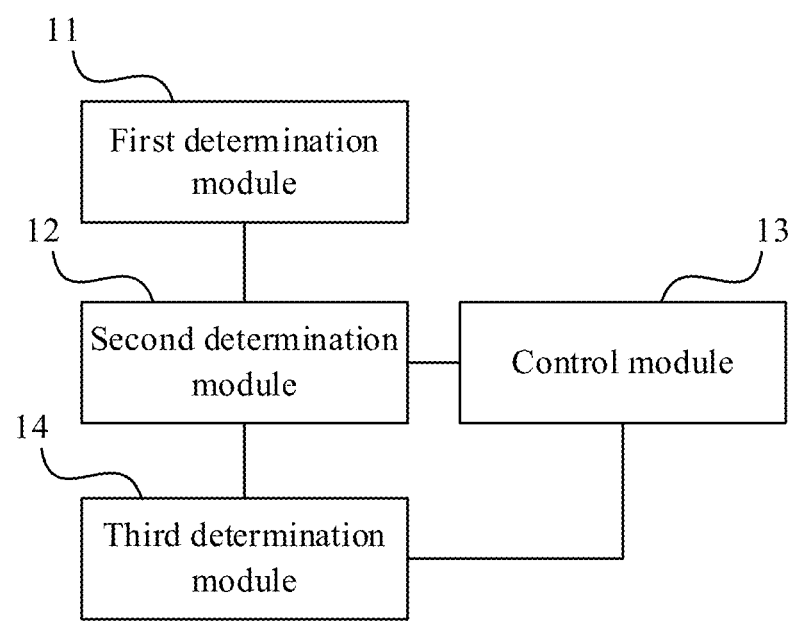
FIG. 4 is a schematic diagram of a system for controlling a motor to switch from an open loop to a closed loop according to another embodiment of the present disclosure.

The system according to an embodiment of the present disclosure, as illustrated in FIG. 4, further includes a third determination module 14.

The second determination module 12 is further configured to send a third control instruction to the third determination module 14 when the absolute value of the angle difference is greater than the preset angle.

The third determination module 14 is configured to determine whether an open-loop current of the motor is less than or equal to a minimum current value in response to a reception of the third control instruction; if the open-loop current of the motor is less than or equal to the minimum current value, to send the second control instruction to the control module 13; and if the open-loop current of the motor is greater than the minimum current value, to reduce the open-loop current of the motor by the preset value and to send the first control instruction to the second determination module 12.

In an embodiment of the present disclosure, when the motor is controlled to operate in the open-loop manner, the open-loop current of the motor is set to an initial open-loop current value. After the rotational speed of the motor reaches the preset rotational speed, if the absolute value of the angle difference between the open-loop angle and the calculated position angle of the motor is greater than the preset angle, it indicates that there may be problems such as motor speed vibration that cause the motor to not run stably.

Since the calculated position angle is obtained through estimation, in order to avoid a situation where the absolute value of the angle difference is greater than the preset angle due to the inaccurate estimation, the third determination module 14 according to an embodiment of the present disclosure further determines whether the open-loop current of the motor is less than or equal to the minimum current value. If the open-loop current is less than or equal to the minimum current value, it indicates that the difference between the open-loop current and the current actually required by the closed loop will not be too large, and the angle difference between the open-loop angle and the actual position angle will not be too large. Therefore, the motor may be controlled to operate in the closed-loop manner.

If the open-loop current is greater than the minimum current value, it indicates that the difference between the open-loop current and the current actually required by the closed loop is too large, and the angle difference between the open-loop angle and the actual position angle is also too large. At this time, the open-loop current needs to be reduced. That is, the initial open-loop current value minus the preset value obtain a reduced open-loop current value. As the open-loop current decreases, the angle difference between the open-loop angle and the actual position angle also decreases. Therefore, after the method returns to step 3, if the absolute value of the angle difference is less than or equal to the preset angle, the motor may be controlled to operate in the closed-loop manner. If the absolute value of the angle difference is greater than the preset angle, the open-loop current is reduced again, until the angle difference meets the condition for controlling the motor to operate in the closed-loop manner.

The system according to an embodiment of the present disclosure further includes a calculation module and a position calculation unit.

The calculation module is configured to integrate the rotational speed of the motor to obtain the open-loop angle of the motor. The position calculation unit is configured to estimate a position angle of a rotor of the motor to obtain the calculated position angle.

Optionally, the preset angle ranges from 0° to 25°.

Optionally, $I_{limit}=I_{open}*n$, where n is greater than or equal to 0 and less than or equal to 1. When n=0, it indicates that the motor rotates forward under external power, and the forward rotational speed is greater than or equal to the preset rotational speed. In this case, the minimum current value $I_{limit}$ of the motor may be determined as 0, that is, n=0. When the external load is large, the current required to drive the motor may be consistent with the initial open-loop current value $I_{open}$. At this time, the minimum current value $I_{limit}$ of the motor may be determined as the initial open-loop current value, that is, $I_{limit}=I_{open}$, n=1, where $I_{limit}$ is the minimum current value, $I_{open}$ is the initial open-loop current value, and n is a constant value or a changing value.

Optionally, in an embodiment, controlling the reduction of the open-loop current of the motor specifically includes: setting updated $I_{open}=I_{open}-I_0$, where $I_0$ is the preset value, $I_0=I_{open}/f$, and f is the execution frequency of the aforementioned method. It should be noted that, in other embodiments, other manners may be used to control the reduction of the open-loop current of the motor, for example, $I_0$ may also be changed according to a function such as a trigonometric function.

In the system for controlling the motor according to the present disclosure, after the rotational speed of the motor reaches the preset rotational speed in the open-loop operation of the motor, it is determined whether the absolute value of the angle difference between the open-loop angle and the calculated position angle of the motor is greater than the preset angle. If the absolute value of the angle difference is less than or equal to the preset angle, the motor is controlled to operate in the closed-loop manner so as to avoid the situation where the motor cannot operate stably due to problems such as motor speed vibration caused by too large angle difference between the open-loop angle and the calculated position angle.

In addition, when the absolute value of the angle difference is greater than the preset angle, it is further determined whether the open-loop current of the motor is less than or equal to the minimum current value. If so, the motor is controlled to operate in the closed-loop manner. If not, the open-loop current of the motor is reduced by the preset value, and the method return to step 3, so as to avoid the situation where the absolute value of the angle difference is greater than the preset angle due to the inaccurate estimation of the position angle.

A controller is further provided according to an embodiment of the present disclosure, which includes the system for controlling the motor according to any of the above embodiments.

Various embodiments in the specification are described in a progressive manner. Each embodiment focuses on differences from other embodiments. Same or similar parts between various embodiments may be referred to each other. For an apparatus disclosed according to the embodiments, since the apparatus corresponds to the method disclosed according to the embodiments, the description of the apparatus is relatively simple, and relevant parts may be referred to the description of the method.

The foregoing description of the disclosed embodiments enables those skilled in the art to implement or use the present disclosure. Various modifications to these embodiments will be apparent to those skilled in the art. General principles defined herein may be implemented in other embodiments without departing from the spirit or scope of the present disclosure. Therefore, the present disclosure will not be limited to the embodiments illustrated herein, and instead, should conform to the widest scope consistent with principles and novel features disclosed in the present disclosure.

What is claimed is:

1. A method for controlling a motor, comprising:
    controlling a motor to operate in an open-loop manner;
    determining whether a rotational speed of the motor reaches a preset rotational speed;
    determining whether an absolute value of an angle difference between an open-loop angle and a calculated position angle of the motor is greater than a preset angle, in a case that the rotational speed of the motor reaches the preset rotational speed; and
    controlling the motor to operate in a closed-loop manner, in a case that the absolute value of the angle difference is less than or equal to the preset angle.

2. The method according to claim 1, further comprising:
    in a case that the absolute value of the angle difference is greater than the preset angle,
    determining whether an open-loop current of the motor is less than or equal to a minimum current value;
    controlling the motor to operate in the closed-loop manner, in a case that the open-loop current of the motor is less than or equal to the minimum current value; and
    reducing the open-loop current of the motor, and returning to a step of determining whether the absolute value of the angle difference between the open-loop angle and the calculated position angle of the motor is greater than the preset angle, in a case that the open-loop current of the motor is greater than the minimum current value.

3. The method according to claim 1, wherein before determining whether the absolute value of the angle difference between the open-loop angle and the calculated position angle of the motor is greater than the preset angle, the method further comprises:
    integrating the rotational speed of the motor to obtain the open-loop angle of the motor; and
    calculating the calculated position angle of the motor by a position calculation unit.

4. The method according to claim 1, wherein the preset angle ranges from 0° to 25°.

5. The method according to claim 2, wherein $I_{limit}=I_{open}*n$, wherein n is greater than or equal to 0 and less than or equal to 1, $I_{limit}$ is the minimum current value, and $I_{open}$ is an initial open-loop current value.

6. A system for controlling a motor, comprising a first determination module, a second determination module, and a control module; wherein
    the first determination module is configured to determine whether a rotational speed of the motor reaches a preset rotational speed when a motor operates in an open-loop manner, and to send a first control instruction to the second determination module in a case that the rotational speed of the motor reaches the preset rotational speed;
    the second determination module is configured to determine whether an absolute value of an angle difference between an open-loop angle and a calculated position angle of the motor is greater than a preset angle in response to a reception of the first control instruction, and to send a second control instruction to the control module in a case that the absolute value of the angle difference is less than or equal to the preset angle; and
the control module is configured to control the motor to operate in the open-loop manner, and to control the motor to operate in a closed-loop manner in response to a reception of the second control instruction.

7. The system according to claim 6, further comprising a third determination module; wherein
the second determination module is further configured to send a third control instruction to the third determination module in a case that the absolute value of the angle difference is greater than the preset angle; and
the third determination module is configured to determine whether an open-loop current of the motor is less than or equal to a minimum current value in response to a reception of the third control instruction; to send the second control instruction to the control module, in a case that the open-loop current of the motor is less than or equal to the minimum current value; and to reduce the open-loop current of the motor and to send the first control instruction to the second determination module, in a case that the open-loop current of the motor is greater than the minimum current value.

8. The system according to claim 6, further comprising a calculation module and a position calculation unit; wherein
the calculation module is configured to integrate the rotational speed of the motor to obtain the open-loop angle of the motor; and
the position calculation unit is configured to calculate a position angle of a rotor of the motor to obtain the calculated position angle.

9. The system according to claim 6, wherein the preset angle ranges from 0° to 25°.

10. The system according to claim 7, wherein $I_{limit}=I_{open}*n$, wherein n is greater than or equal to 0 and less than or equal to 1, and wherein $I_{limit}$ is the minimum current value, and $I_{open}$ is an initial open-loop current value.

11. A controller, comprising a system for controlling a motor, wherein the system comprises a first determination module, a second determination module, and a control module; and wherein:
the first determination module is configured to determine whether a rotational speed of the motor reaches a preset rotational speed when a motor operates in an open-loop manner, and to send a first control instruction to the second determination module in a case that the rotational speed of the motor reaches the preset rotational speed;
the second determination module is configured to determine whether an absolute value of an angle difference between an open-loop angle and a calculated position angle of the motor is greater than a preset angle in response to a reception of the first control instruction, and to send a second control instruction to the control module in a case that the absolute value of the angle difference is less than or equal to the preset angle; and
the control module is configured to control the motor to operate in the open-loop manner, and to control the motor to operate in a closed-loop manner in response to a reception of the second control instruction.

12. The controller according to claim 11, wherein the system further comprises a third determination module, wherein:
the second determination module is further configured to send a third control instruction to the third determination module in a case that the absolute value of the angle difference is greater than the preset angle; and
the third determination module is configured to determine whether an open-loop current of the motor is less than or equal to a minimum current value in response to a reception of the third control instruction; to send the second control instruction to the control module, in a case that the open-loop current of the motor is less than or equal to the minimum current value; and to reduce the open-loop current of the motor and to send the first control instruction to the second determination module, in a case that the open-loop current of the motor is greater than the minimum current value.

13. The controller according to claim 11, wherein the system further comprises a calculation module and a position calculation unit, wherein:
the calculation module is configured to integrate the rotational speed of the motor to obtain the open-loop angle of the motor; and
the position calculation unit is configured to calculate a position angle of a rotor of the motor to obtain the calculated position angle.

14. The controller according to claim 12, wherein the system further comprises a calculation module and a position calculation unit, wherein:
the calculation module is configured to integrate the rotational speed of the motor to obtain the open-loop angle of the motor; and
the position calculation unit is configured to calculate a position angle of a rotor of the motor to obtain the calculated position angle.

15. The controller according to claim 11, wherein the preset angle ranges from 0° to 25°.

16. The controller according to claim 12, wherein $I_{limit}=I_{open}*n$, wherein n is greater than or equal to 0 and less than or equal to 1, and wherein $I_{limit}$ is the minimum current value, and $I_{open}$ is an initial open-loop current value.

17. The method according to claim 2, wherein before determining whether the absolute value of the angle difference between the open-loop angle and the calculated position angle of the motor is greater than the preset angle, the method further comprises:
integrating the rotational speed of the motor to obtain the open-loop angle of the motor; and
calculating the calculated position angle of the motor by a position calculation unit.

18. The system according to claim 7, further comprising a calculation module and a position calculation unit, wherein:
the calculation module is configured to integrate the rotational speed of the motor to obtain the open-loop angle of the motor; and
the position calculation unit is configured to calculate a position angle of a rotor of the motor to obtain the calculated position angle.

* * * * *